US010353098B2

(12) United States Patent
Martin et al.

(10) Patent No.: US 10,353,098 B2
(45) Date of Patent: Jul. 16, 2019

(54) REMOVING NOISE FROM A SEISMIC MEASUREMENT

(71) Applicant: WESTERNGECO L.L.C., Houston, TX (US)

(72) Inventors: James Edward Martin, Cottenham (GB); Ahmet Kemal Özdemir, Asker (NO); Bent Andreas Kjellesvig, Oslo (NO); Ali Ozbek, Milton (GB)

(73) Assignee: WESTERNGECO L.L.C., Houston, TX (US)

( * ) Notice: Subject to any disclaimer, the term of this patent is extended or adjusted under 35 U.S.C. 154(b) by 1370 days.

(21) Appl. No.: 14/308,889

(22) Filed: Jun. 19, 2014

(65) Prior Publication Data
US 2014/0369164 A1 Dec. 18, 2014

Related U.S. Application Data

(62) Division of application No. 12/611,551, filed on Nov. 3, 2009, now Pat. No. 8,773,949.

(51) Int. Cl.
*G01V 1/36* (2006.01)
*G01V 1/38* (2006.01)

(52) U.S. Cl.
CPC .............. *G01V 1/368* (2013.01); *G01V 1/364* (2013.01); *G01V 1/3808* (2013.01); *G01V 1/38* (2013.01); *G01V 2210/21* (2013.01); *G01V 2210/324* (2013.01)

(58) Field of Classification Search
CPC ...... G01V 1/364; G01V 1/368; G01V 1/3808; G01V 2210/21; G01V 2210/324; G01V 1/38
USPC .............................................. 367/21, 24, 45
See application file for complete search history.

(56) References Cited

U.S. PATENT DOCUMENTS

| 4,499,565 | A | 2/1985 | Fix et al. |
| 5,010,526 | A | 4/1991 | Linville et al. |
| 5,327,366 | A | 7/1994 | Mau |
| 5,740,036 | A | 4/1998 | Ahuja et al. |
| 6,389,362 | B1 * | 5/2002 | Garotta ................. G01V 1/20 702/17 |
| 6,446,008 | B1 | 9/2002 | Ozbek |
| 6,446,009 | B1 | 9/2002 | Baeten et al. |

(Continued)

FOREIGN PATENT DOCUMENTS

| GB | 2379741 B | * 11/2003 | ............. G01V 1/201 |
| GB | 2458642 A | 9/2009 | |
| WO | 0042448 A1 | 7/2000 | |

OTHER PUBLICATIONS

F. Gustafsson, "Determining the initial states in forward-backward filtering," IEEE Transactions on Signal Processing, pp. 988-992, Apr. 1996, vol. 44, Issue 4.
M.H. Hayes, "Statistical Digital Signal Processing and Modeling", Spectrum Estimation, 2009, 17 pages.
J.H. McClellan, et al., "A computer program for designing optimum FIR linear phase digital filters," IEEE Transactions on Audio Electroacoustics, vol. A U 21, 1973 pp. 506-526.

(Continued)

*Primary Examiner* — Daniel L Murphy
(74) *Attorney, Agent, or Firm* — Kevin B. McGoff

(57) ABSTRACT

A technique includes spatially filtering a signal that is derived from a seismic acquisition. The filtering is associated with a filter length, and the filtering includes varying the filter length with frequency. The filtering may be used in connection with adaptive noise attenuation, which is applied to decomposed subbands. Furthermore, the filtering may be applied during the reconstruction of the signal from the subbands.

15 Claims, 15 Drawing Sheets

(56) References Cited

U.S. PATENT DOCUMENTS

| | | |
|---|---|---|
| 6,651,007 B2 | 11/2003 | Ozbek |
| 6,668,228 B1 | 12/2003 | Özbek et al. |
| 6,757,343 B1 | 6/2004 | Ortega et al. |
| 6,801,473 B2 | 10/2004 | Matteucci et al. |
| 7,333,393 B2 | 2/2008 | Vossen et al. |
| 8,773,949 B2 | 7/2014 | Martin et al. |
| 2002/0141287 A1 | 10/2002 | Lazaratos |
| 2003/0078734 A1 | 4/2003 | Ozbek |
| 2003/0176975 A1 | 9/2003 | Matteucci et al. |
| 2005/0073909 A1* | 4/2005 | Laws .............. G01V 1/201 367/15 |
| 2008/0049551 A1 | 2/2008 | Muyzert et al. |
| 2008/0285383 A1 | 11/2008 | An |
| 2009/0103395 A1 | 4/2009 | Willen |
| 2009/0147621 A1 | 6/2009 | Hegna |
| 2009/0213691 A1 | 8/2009 | Christie et al. |
| 2011/0103182 A1 | 5/2011 | Marin et al. |
| 2012/0163122 A1 | 6/2012 | Ozdemir et al. |

OTHER PUBLICATIONS

J.R. Treichler, "Notes of the Design of Optimal FIR Filters," Applied Signal Technology, Inc. Nov. 1989.

Extended Search Report for the equivalent European patent application No. 10828807.7 dated Sep. 29, 2014, pp. 1-7.

International Search Report issued in PCT/US2010/053752 dated Jun. 30, 2011, pp. 1-12.

International Search Report issued in PCT/US2011/064380 dated Sep. 3, 2012, pp. 1-8.

Office Action for the cross referenced U.S. Appl. No. 12/977,383 dated Nov. 21, 2013.

Written Opinion for the cross referenced International patent application PCT/US2011/064380 dated Sep. 3, 2012.

Written Opinion for the equivalent International patent application PCT/US2010/053752 dated Jun. 30, 2011.

\* cited by examiner

REMOVING NOISE FROM A SEISMIC MEASUREMENT

CROSS-REFERENCE TO RELATED APPLICATIONS

This application is a divisional of U.S. patent application Ser. No. 12/611,551 filed Nov. 3, 2009, which is incorporated herein by reference in its entirety.

BACKGROUND

The invention generally relates to removing noise from a seismic measurement.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones and/or accelerometers), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes spatially filtering a signal that is derived from a seismic acquisition. The filtering is associated with a filter length, and the filtering includes varying the filter length with frequency.

In another embodiment of the invention, a technique includes decomposing a signal that is derived from a seismic acquisition into subbands in successive stages. The subbands are associated with at least different frequency ranges of the signal. The technique includes selectively applying adaptive noise attenuation in between the successive stages such that the stages decompose noise-attenuated subbands; and reconstructing the signal from the subbands resulting from the decomposition.

In another embodiment of the invention, a technique includes decomposing a signal that is derived from a seismic acquisition into subbands, which are associated with at least different frequencies. The technique includes reconstructing the signal from the subbands, including spatially filtering the subband; and for each subband, regulating a length of the filtering based on the frequencies that are associated with the subband.

In another embodiment of the invention, a technique includes filtering a signal derived from a seismic acquisition and mitigating edge effects in connection with the filtering.

The mitigation includes using autoregressive modeling to extrapolate the signal beyond an acquisition geometry to form an extrapolated signal and performing variable length spatial filtering on the extrapolated signal.

In yet another embodiment of the invention, a technique includes providing an n dimensional finite impulse response (FIR) filter that is formed from a plurality of n−1 dimension FIR filters; and spatially filtering a signal derived from a seismic acquisition in n dimensions using the plurality of n−1 dimension FIR filters to generate a filtered signal.

Advantages and other features of the invention will become apparent from the following drawing, description and claims.

DETAILED DESCRIPTION

Figure 1:
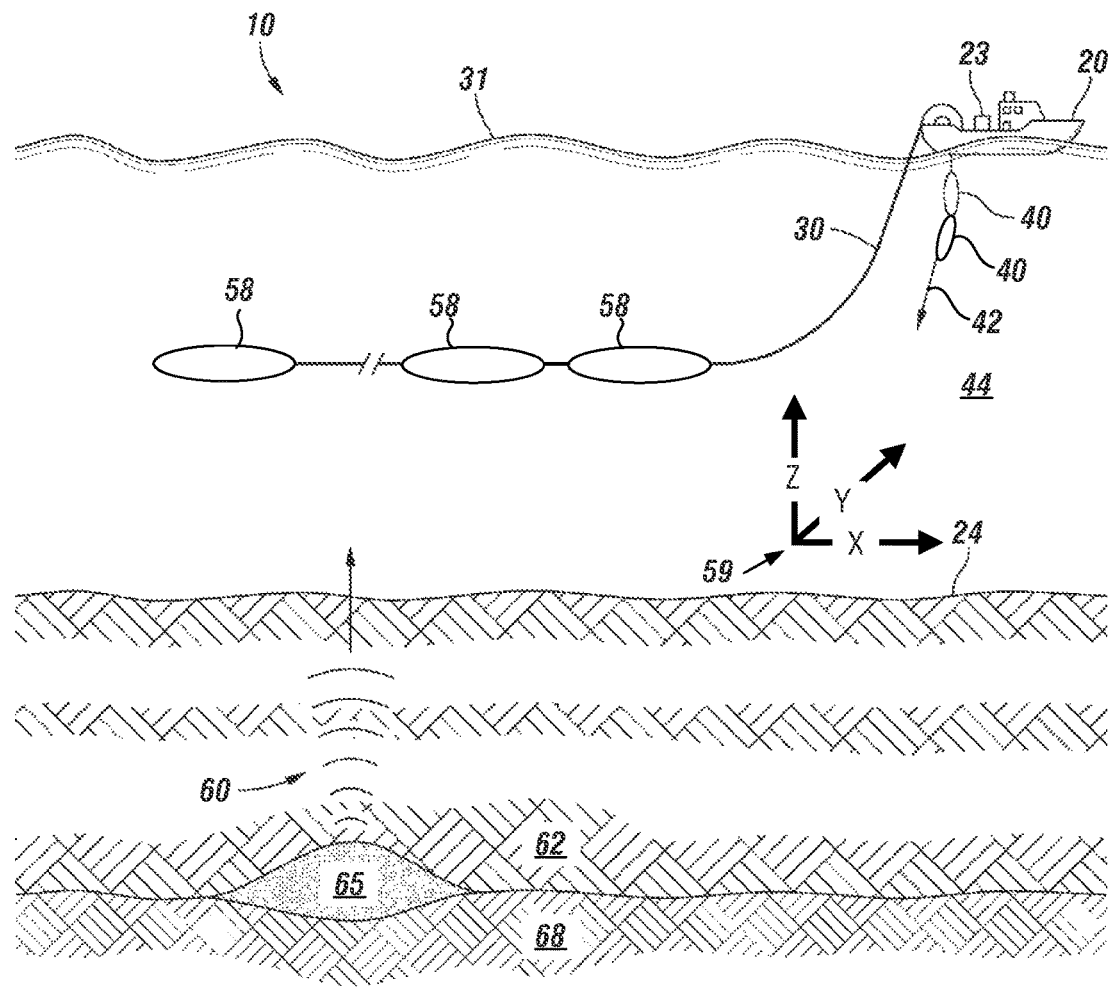
FIG. 1 is a schematic diagram of a marine-based seismic data acquisition system according to an embodiment of the invention.

FIG. 1 depicts an embodiment 10 of a marine-based seismic data acquisition system in accordance with some embodiments of the invention. In the system 10, a survey vessel 20 tows one or more seismic streamers 30 (one exemplary streamer 30 being depicted in FIG. 1) behind the vessel 20. In one non-limiting example, the streamers 30 may be arranged in a spread in which multiple streamers 30 are towed in approximately the same plane at the same depth. As another non-limiting example, the streamers may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals. The streamers 30 contain seismic sensor units 58, which include, in accordance with embodiments of the invention, multi-component sensors. Each multi-component sensor is capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular seismic sensor unit 58 may include at least one particle motion sensor 70 for purposes of measuring a component of particle motion along a particular sensitive axis 59 (the x, y or z axis, for example). As a more specific example, the seismic sensor unit 58 may include a particle velocity sensor that is oriented to acquire a measurement of a particle velocity along the depth, or z, axis; a particle velocity sensor to sense a particle velocity along the crossline, or y, axis; a particle velocity sensor to sense a velocity along the inline, or x, axis; multiple particle velocity sensors to sense particle velocities along all three (x, y and z) axes; etc. Alternatively, in other embodiments of the invention, the particle motion sensor(s) of each seismic sensor unit 58 may sense a particle motion other than velocity (an acceleration, for example).

It is noted that in accordance with some embodiments of the invention, each seismic sensor unit 58 may contain a single component sensor, such as a pressure sensor. Thus, many variations are contemplated and are within the scope of the appended claims.

In addition to the seismic sensor units 58, the marine seismic data acquisition system 10 also includes one or more seismic sources 40 (two exemplary seismic sources 40 being depicted in FIG. 1), such as air guns and the like. In some embodiments of the invention, the seismic source(s) 40 may be coupled to, or towed by, the survey vessel 20. Alternatively, in other embodiments of the invention, the seismic source(s) 40 may operate independently of the survey vessel 20, in that the source(s) 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic source(s) 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are created by the source(s) 40 produce corresponding reflected acoustic signals, or pressure waves 60, which are sensed by the seismic sensors of the seismic sensor unit 58. It is noted that the pressure waves that are received and sensed by the seismic sensors include "up going" pressure waves that propagate to the sensors without reflection, as well as "down going" pressure waves that are produced by reflections of the pressure waves 60 from an air-water boundary, or free surface 31.

The seismic sensors of the seismic sensor units 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular seismic sensor unit 58 may provide a trace, which corresponds to a measure of a pressure wavefield by its hydrophone; and the seismic sensor unit 58 may provide (depending on the particular embodiment of the invention) one or more traces that correspond to one or more components of particle motion.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a data processing system that may be, for example, located on land or on the vessel 20.

A given seismic measurement contains both desired seismic information and noise. In the following discussion, the seismic measurement is represented by a signal that contains both the desired seismic signal component (i.e., the component indicative of a pressure or particle motion measurement) and a noise component. The signal may be formed from raw data that are acquired directly from the seismic sensors, or may be formed by data that are generated by some degree of processing of the raw data, depending on the particular embodiment of the invention. Regardless of whether the signal is acquired directly or not by the seismic sensors, the signal is considered to be derived from a seismic acquisition in the context of this application. Spatial filtering and adaptive noise attenuation-based techniques and systems are disclosed herein for purposes of removing, or attenuating, the noise component to thereby recover the seismic signal component.

As a more specific example, the signal that is derived from a seismic acquisition may contain a relatively low frequency seismic signal component. In this regard, due to the advent of new technology, low frequency seismic signals are becoming more important, and modern acquisition geometry allows useful seismic information to be acquired at lower frequencies than what was possible in the past with relatively shallow towed-streamers. The low frequency content provides deeper penetration and therefore, improved imaging beneath highly absorptive overburdens, such as basalt or salt; less dependency of seismic inversion upon model-based methods; better steep-dip imaging; and better effective Q estimation.

Separating the low frequency seismic signal component from the noise component may encounter several challenges, as the noise and seismic signal components are functions of frequency. In this manner, at lower frequencies, the noise is stronger; the seismic signal is weaker; and the seismic signal has significantly large wavelengths. Conversely, at higher frequencies, the noise is weaker; the seismic signal is stronger; and the seismic signal has shorter wavelengths.

Figure 2:
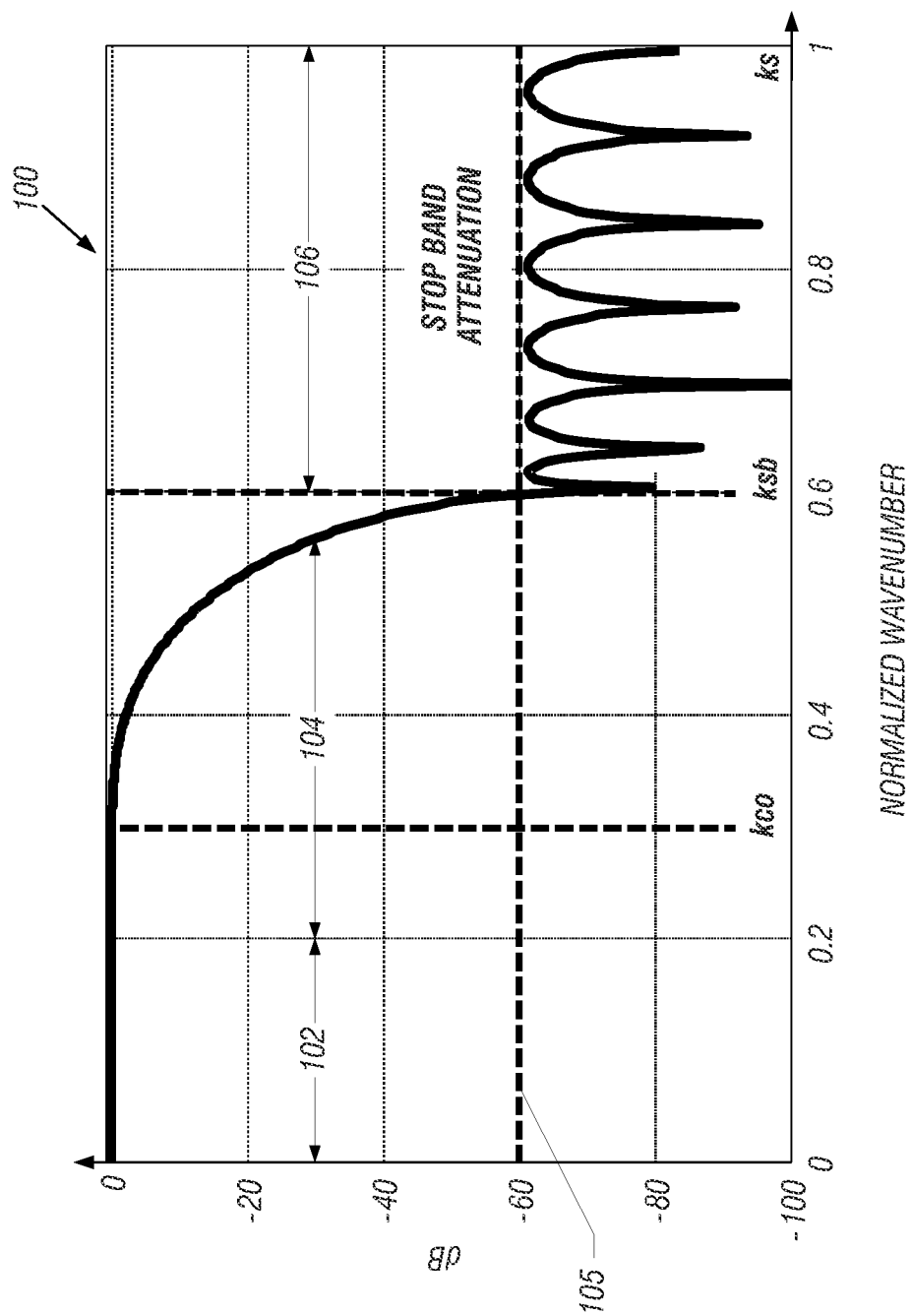
FIG. 2 is an illustration of a response of a low pass spatial filter according to an embodiment of the invention.

In accordance with embodiments of the invention, the signal may be spatially filtered by a high cut, or low pass, spatial filter to attenuate at least some of the noise. In general, a low pass spatial filter attenuates relatively high wavenumber (short wavelength) signals and allows relatively low wavenumber (high wavelength) signals to pass through, as depicted in an exemplary low pass filter response 100 in FIG. 2. Referring to FIG. 2, in general, the filter has a pass band 102, which allows energy that is associated with a range of relatively small wavenumbers (i.e., a range of relatively long wavelengths) to be communicated through the filter at unity or near unity gain. The pass band 102 extends from wavenumbers near zero to a cutoff wavenumber called "$k_{co}$." The filter also has a stop band 106, which extends to higher wavenumbers from a stop band wavenumber, called "$k_{sb}$." The stop band 106 has an associated stop band attenuation (SBA) 105 and attenuates energy with larger wavenumbers.

Between the pass band 102 and the stop band 106, the filter has a transition band 104, which is defined between the cutoff wavenumber $k_{co}$ and the stop band wavenumber $k_{sb}$. The sharpness of the transition band 104 is a function of the order, or length, of the filter. In this regard, a filter with a longer length can be designed to have a sharper transition (i.e., a more abrupt transition) between the stop band 106 and the pass band 102, as compared to the sharpness of the transition for a shorter length filter.

As a non-limiting example, in accordance with embodiments of the invention, the low pass spatial filter may be a finite impulse response (FIR) filter. Some exemplary design techniques that may be employed to design an FIR filter include window-based methods, Fourier domain-based sampling techniques, weighted least squares techniques and an equiripple filter design technique. As a more specific example, in accordance with some embodiments of the invention, the filter may be designed, in general, pursuant to an equiripple filter technique that is described in J. H. McClellan, T. W. Parks, and L. R. Rabiner, entitled "A Computer Program for Designing Optimum FIR Linear Phase Digital Filters," *IEEE Transactions on Audio Electroacoustics*, 1973, Vol. AU21: pp. 506-526. It is noted that the optimality criterion in this particular technique is the maximum deviation of the desired filter response from the actual filter response. This is often called the mini-max optimization problem in the literature, because the objective is to minimize the maximum deviation. The designed filter has equal amplitude deviation from the desired response in both the pass 102 and stop 106 bands. The relative level of the pass 102 and stop 106 band ripples may be controlled by introducing weights in the design problem. Other filter design techniques may be used, in accordance with other embodiments of the invention.

Figure 3:
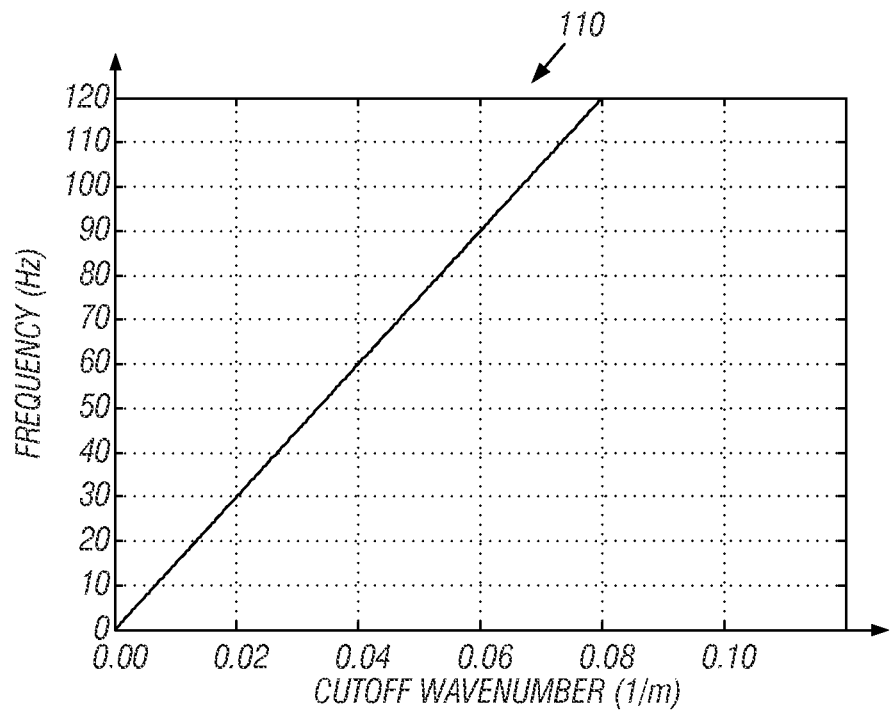
FIG. 3 is a plot representing a cutoff wavenumber of the filter of FIG. 2 as a function of frequency according to an embodiment of the invention.
Figure 9:
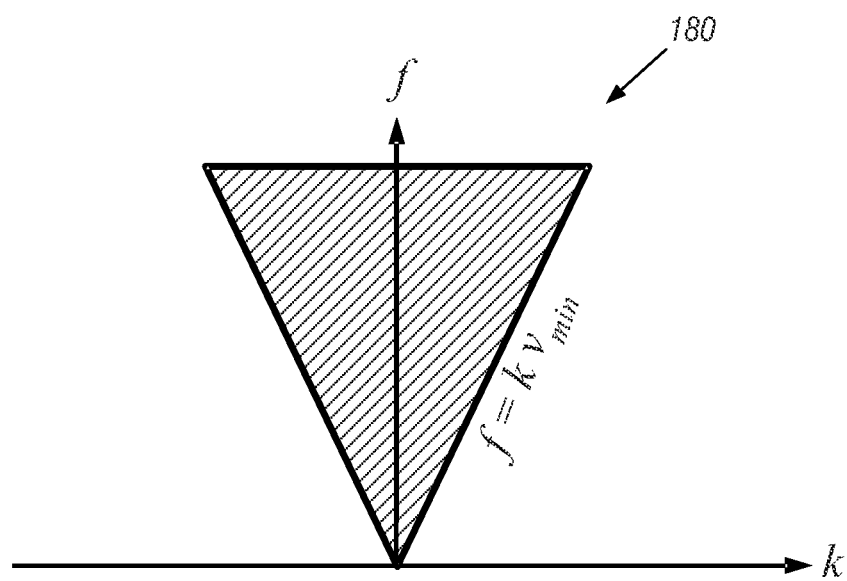
FIG. 9 is an illustration of the energy distribution of a two-dimensional seismic signal in the frequency-wavenumber domain according to an embodiment of the invention.

For a towed marine-based seismic acquisition, the apparent velocity of the seismic data (in the common shot domain) is constrained to be within a signal cone 180, which is depicted in FIG. 9. In other words, the desired seismic signal appears inside the signal cone 180. The boundaries of the signal cone 180 are defined by the acoustic speed of sound in water. The low pass spatial filter, in accordance with embodiments of the invention, may be designed to attenuate the noise outside of the signal cone 180 by selecting the cutoff wavenumber $k_{co}$ as follows:

$$k_{co} = f/v, \qquad \text{Eq. 1}$$

where "f" represents frequency; and "v" represents the acoustic speed of sound in water. Referring to FIG. 3, a plot 110 illustrates the variation of the cutoff wavenumber $k_{co}$ with frequency. In the plot 110, the acoustic speed of sound in water was chosen to be 1500 meters per second (m/s), as a non-limiting example.

Figure 4:
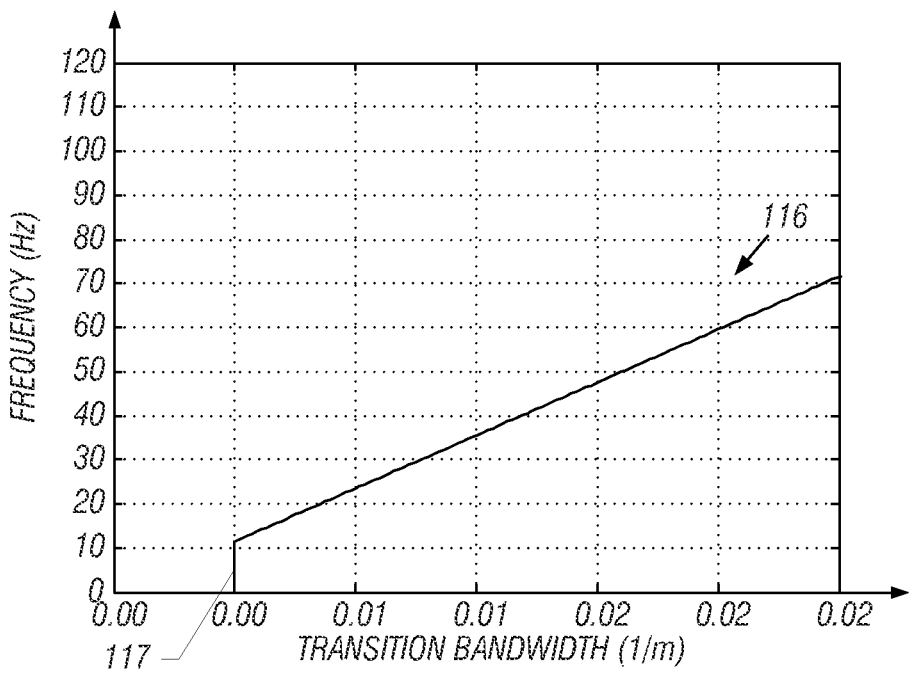
FIG. 4 is a plot of a transition bandwidth of the filter of FIG. 2 as a function of frequency according to an embodiment of the invention.

In accordance with embodiments of the invention, the spatial filtering is conducted so that the order, or length (called "L" herein), of the low pass spatial filter varies as a function of the frequency being filtered, for purposes of accommodating low frequency seismic signals. Because the filter length L varies as a function of frequency, the filter may be referred to a variable length spatial filter (VLSF). As a non-limiting example, one way to construct a VLSF is to vary the transition bandwidth (TBW), which is the bandwidth of the transition band 104 (FIG. 2), proportionally to the signal frequency, as depicted in a plot 116 of the transition bandwidth TBW in FIG. 4. As depicted in FIG. 4, in accordance with some embodiments of the invention, at lower frequencies, the "sharpness" of the filter is restricted by defining a minimum transition bandwidth, as indicated at reference numeral 117. It is noted that other variations are contemplated and are within the scope of the appended claims. For example, in other embodiments of the invention, the transition bandwidth may be fixed, and the stop band attenuation 105 (which is depicted as being a fixed -60 dB attenuation in the non-limiting example shown in FIG. 2) may be varied.

The edge of the stop band, i.e., the stop band wavenumber $k_{sb}$, may be defined as the sum of the cutoff wavenumber $k_{co}$ and the transition bandwidth TBW, as follows:

$$k_{sb} = k_{co} + \text{TBW}. \qquad \text{Eq. 2}$$

Figure 5:
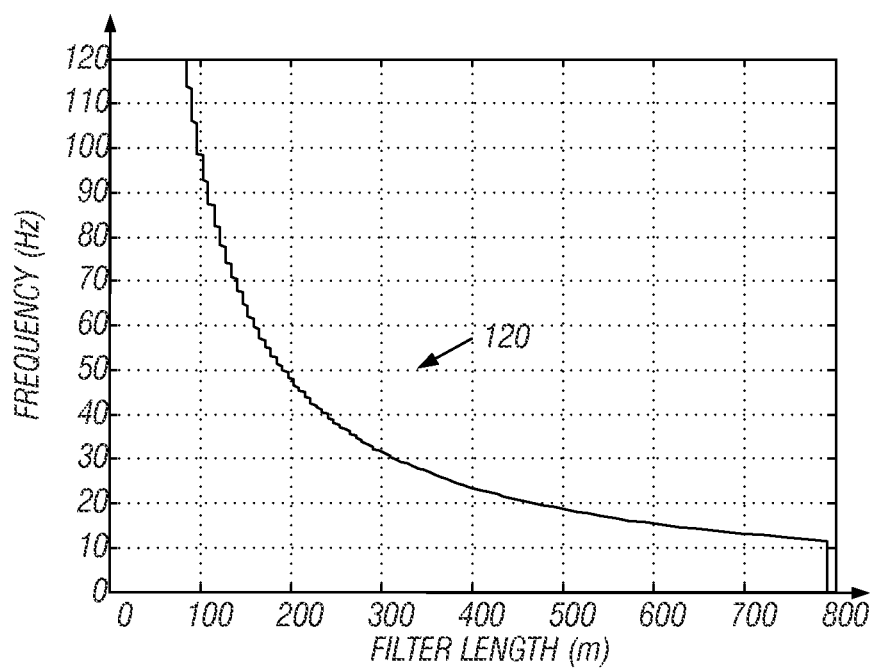
FIG. 5 is a plot of a filter length of the filter of FIG. 2 as a function of frequency according to an embodiment of the invention.

The length L of the filter, which is required to achieve the desired stop band attenuation may be described as follows:

$$L = \frac{(\ln 2 - 0.05 \times \ln 10 \times SBA)}{\pi} \frac{K_N}{TBW}, \qquad \text{Eq. 3}$$

where "SBA" represents the stop band attenuation in decibels. Given the variation in the transition bandwidth TWB with frequency, as illustrated by the plot 116 of FIG. 4, the L filter length also varies with frequency, as illustrated by a plot 120 in FIG. 5.

Figure 6:
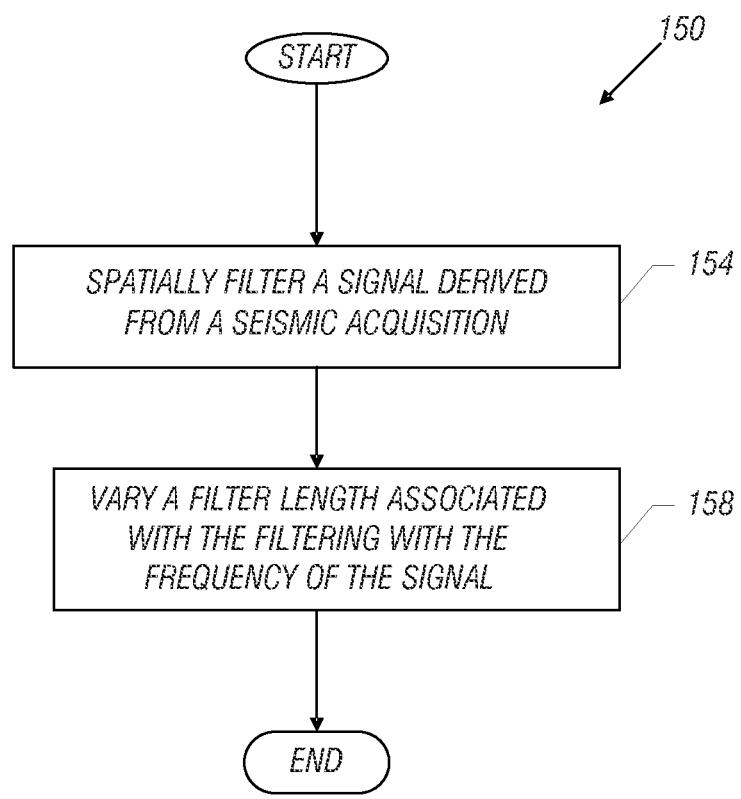
FIGS. 6, 7 and 17 are flow diagrams depicting techniques to spatially filter a signal that is derived from a seismic acquisition according to embodiments of the invention.

Due to the variable filter length, the filtering of a signal derived from a seismic acquisition may be regulated such that the filter length changes with the frequency being filtered. Thus, referring to FIG. 6, a technique 150 in accordance with embodiments of the invention includes spatially filtering (block 154) a signal that is derived from a seismic acquisition, including varying (block 158) a filter length associated with the filtering with the frequency of the signal. Thus, for shorter wavelengths, shorter filter lengths are used; and conversely, when the signal has a longer wavelength, longer filter lengths are employed. Among the advantages of this technique, better noise attenuation may be achieved, and the signal is preserved at lower frequencies due to the increased filter length. Additionally, the filtering exhibits an increased robustness to perturbations at higher frequencies due to the shorter filter length. Other and different advantages are contemplated, in accordance with other embodiments of the invention.

The use of the VLSF has several advantages for purposes of handling edge effects. More specifically, because the VLSF filter is an FIR filter (in accordance with some embodiments of the invention), the edge effects do not propagate into offsets further than the length of the filter. The longer filters are only used at the lower end of the frequency spectrum where the signal has a relatively long wavelength.

For example, at 1 Hertz (Hz), the seismic signal has wavelengths longer than 1.5 kilometers (km). Furthermore, the VLSF is a linear phase filter, and therefore, there is no need for forward-backward, or zero-phase filtering.

Figure 16:
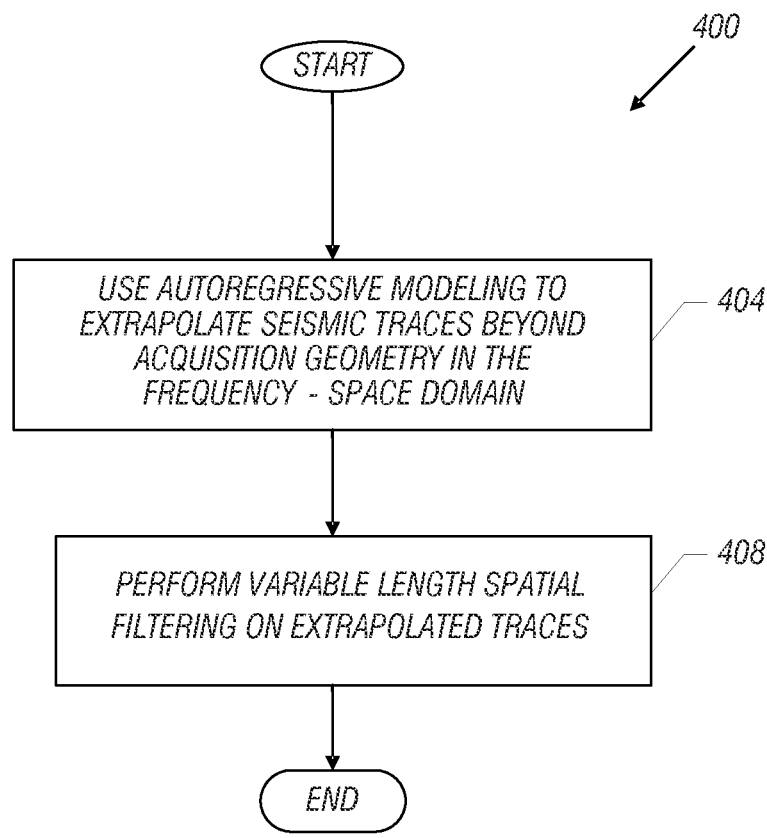
FIG. 16 is a flow diagram depicting a technique to mitigate edge effects due to filtering according to an embodiment of the invention.

In accordance with some embodiments of the invention, the edge effects may be handled by first extrapolating the seismic data by using an auto-regressive prediction technique 400 that is depicted in FIG. 16. Referring to FIG. 16, pursuant to the technique 400, an auto-regressive model is used (block 404) to extrapolate seismic traces beyond the acquisition geometry in the frequency-space domain. More specifically, the auto-regressive model may be first fit and estimated at a particular frequency by using, for example, the autocorrelation technique that is described in Steven M. Kay, "Modern Spectral Estimation: Theory and Application," (Prentice-Hall 1988). Next, the data is extrapolated beyond the acquisition geometry by using the estimated autoregressive model. The amount of extrapolation is based on the filter length at that particular frequency. The technique 400 subsequently includes performing variable length spatial filtering on the extrapolated traces, pursuant to block 408. After application of the VLSF, the extrapolated portions of the traces are discarded. An advantage of this technique is that the autoregressive model may be forced to have a damped response, meaning that the amplitude of the predicted traces decay at larger offsets. It is noted that signals with longer wavelengths may be successfully extrapolated at larger distances. In other words, longer filters are used at lower frequencies, where the signal has longer wavelengths.

Other techniques may be used for purposes of handling edge effects, in accordance with other embodiments of the invention. For example, in other embodiments of the invention, forward-backward filtering may be used to mitigate edge effects. In this technique, the same filter is applied twice: once in forward direction in space and then in reverse direction in space. It is noted that the forward-backward filtering effectively doubles the original length of the filter and may result in transients with longer duration in space.

The transients may be reduced by choosing the initial conditions of the forward and backward filters, as described in Fredrik Gustafsson, "Determining The Initial States In Forward-Backward Filtering," IEEE Transactions on Signal Processing, pp. 988-992, Volume 44, Issue 4 and in A. Özbek and P. Forman, FX-IIR Filter for Seismic Data, U.K. Patent Application 805341.5, which was filed on Mar. 25, 2008. A further improvement is possible by the symmetric extension of the data before the first trace and after the last trace, respectively. This technique is particularly suitable when used with infinite impulse response (IIR) filters, due to the fact that IIR filters in general have non-linear phases; and forward-backward filtering is required to have a zero-phase filter response.

Figure 7:
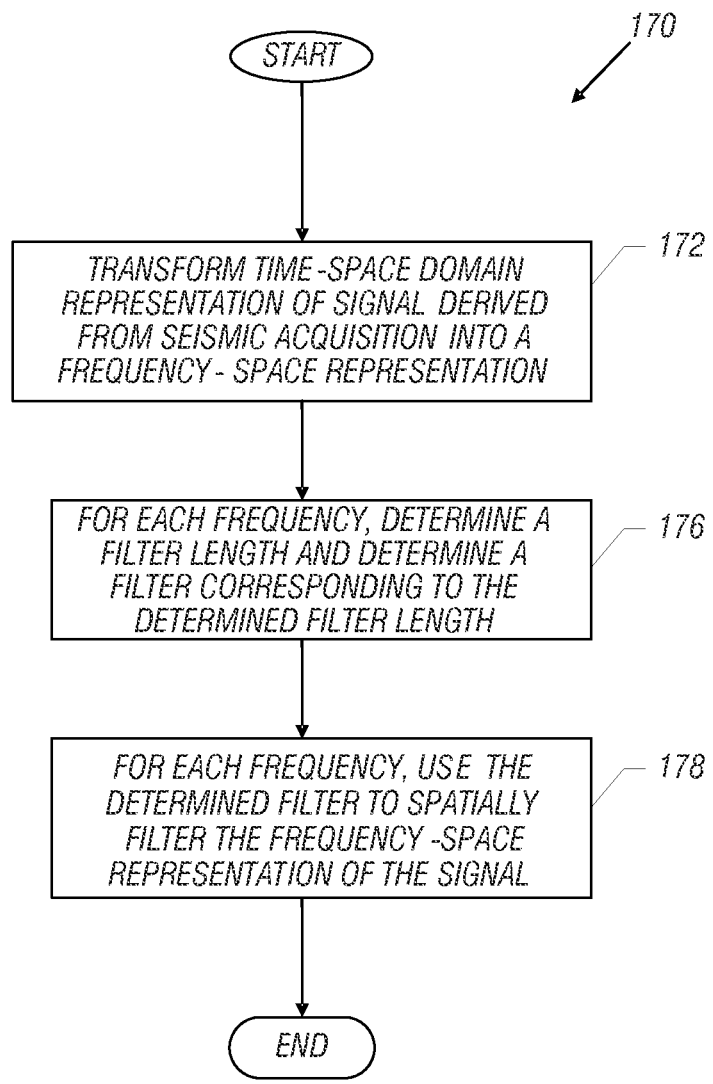

As a more specific example, the VLSF may be used in a signal processing technique 170 that is depicted in FIG. 7, in accordance with some embodiments of the invention. Pursuant to the technique 170, a time-space domain representation of a signal that is derived from a seismic acquisition is first transformed (block 172) into a frequency-space representation. For each frequency, a filter length is determined, pursuant to block 176, which results in the determination of a corresponding filter that has this determined filter length. The determined filters may then be used to spatially filter the frequency-space representation of the signal at the associated frequencies, pursuant to block 178.

In accordance with some embodiments of the invention, the signal may be transformed into the frequency-space domain using a forward Fourier transformation, which is described below:

$$S(f, x) = \sum_t s(t, x) e^{j2\pi ft}, \qquad \text{Eq. 4}$$

where "t" represents time; "x" represents space; "f" represents frequency; "s(t,x)" represents the time-space domain representation of the signal; and "S(f,x)" represents the frequency-space domain representation of the signal. The filter designed pursuant to the technique 170 may be represented by "H(f,x)," and the filtering may be described as follows:

$$G(f, x) = h(f, x) *_x S(f, x), \qquad \text{Eq. 5}$$

where "G(f,x)" represents the frequency-space representation of the filtered data, and "$*_x$" represents spatial convolution. The time-space domain representation of the filtered data, called "g(t,x)," may be determined using an inverse Fourier transformation, as described below:

$$\begin{aligned} g(t, x) &= \int G(f, x) e^{j2\pi ft} df \\ &= h(t, x) * s(t, x), \end{aligned} \qquad \text{Eq. 6}$$

where "*" represents the two-dimensional (2-D) convolution operator, and "h(t,x)" represents the inverse Fourier transformation of the frequency-space representation of the VLSF filters. In other words, the inverse Fourier transformation h(t,x) is the impulse response of the corresponding 2-D FIR filter. This means that the VLSF technique may be used to design multi-dimensional FIR filters. The resulting filters may be applied either in time-space; frequency-space; or frequency-wavenumber domains, depending on the particular embodiment of the invention.

Figure 17:
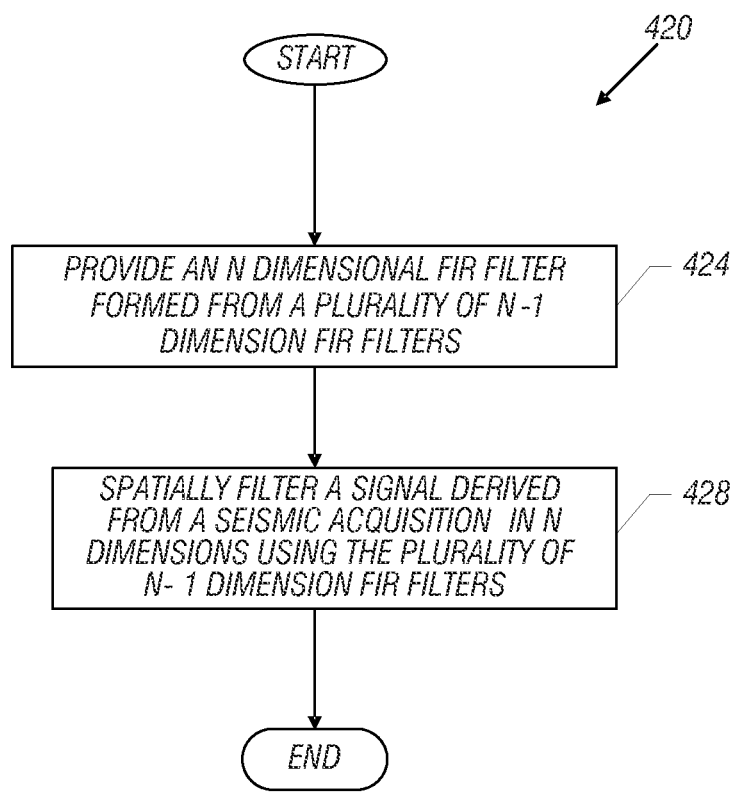

Thus, referring to FIG. 17, in accordance with some embodiments of the invention, a technique 420 includes providing an n-dimensional FIR filter that is formed from a plurality of n−1 dimensional FIR filters, pursuant to block 424. A filter that is derived from a seismic acquisition may be spatially filtered in n dimensions using the plurality of n−1 dimensional FIR filters, pursuant to block 428. For example, a time-space filter may be designed and applied using space filters at every frequency.

The spatial wavenumber content of the signal becomes smaller at lower frequencies, and the variable filter length technique described above provides a very sharp filtering response at lower frequencies. However, this filtering technique does not process the signal within the boundaries of the signal cone 180 (FIG. 9). In order to remove noise within the signal cone 180, an adaptive noise attenuation technique may be used in conjunction with the above-described VLSF technique. Although it may be conceived that similar to the above-described VLSF-based technique, at each frequency, an adaptive noise attenuation algorithm may be used for noise attenuation, such an approach would create ringing noise and artifacts in the time-space domain when used with adaptive filters. The explanation for this behavior is that for the above-described VLSF-based techniques, the wavenumber response of the filters varies smoothly as a function of frequency. However, this smooth variation is not guaranteed when the filter coefficients at a frequency are computed as a function of the data at that frequency. As a result, rapid variation may occur among filter coefficients at adjacent frequencies; and these variations may result in high frequency signal dependent noise in the time-space domain.

Figure 8:
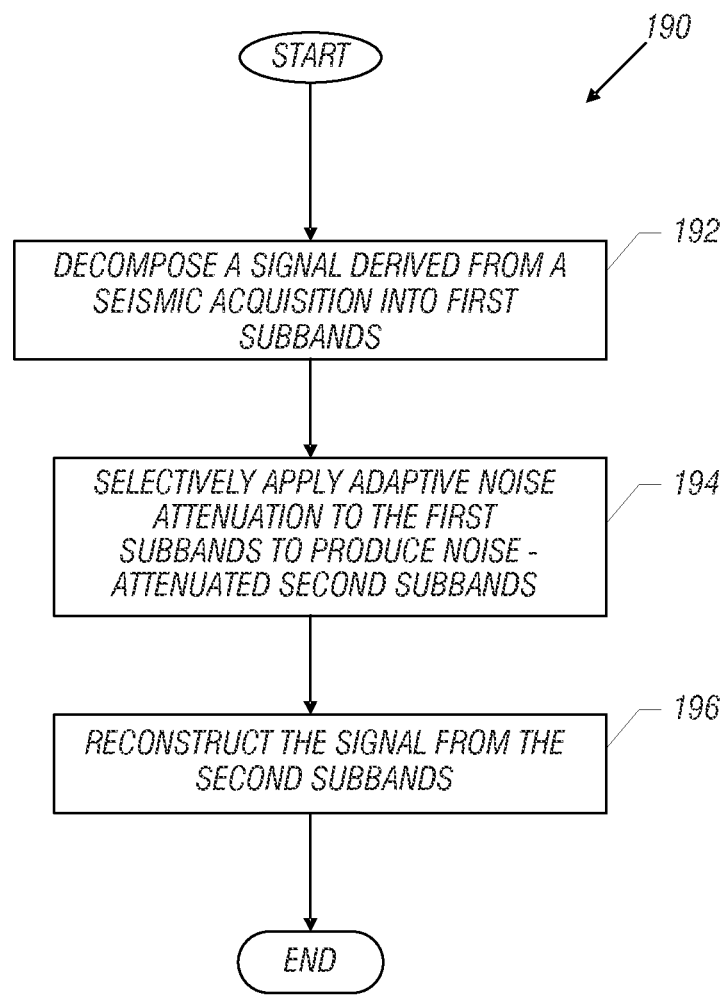
FIGS. 8, 10, 12, 13 and 14 are flow diagrams depicting multiple scale noise attenuation techniques according to embodiments of the invention.

As described below, a multiple scale noise attenuation technique may be used in accordance with some embodiments of the invention, for purposes of attenuating noise within the signal cone 180. More specifically, in accordance with some embodiment of the invention, a technique 190 that is depicted in FIG. 8 may be used. Pursuant to the technique 190, a signal derived from a seismic acquisition is decomposed (block 192) into subbands using a transformation such as a Discrete Wavelet Transform (DWT). As described further below, the subbands are decimated representations of the signal for different subset frequency and wavenumber ranges. The technique 190 includes selectively applying (block 194) adaptive noise attenuation to the subbands to produce noise-attenuated subbands. These noise-attenuated subbands may then be used to reconstruct (block 196) a filtered version of the signal. Additionally, as further described below, in accordance with some embodiments of the invention, the VLSF filtering technique may be applied during the reconstruction process for purposes of removing noise outside of the signal cone 180.

In general, the subbands are higher scale, frequency and wavenumber components of the signal and DWTs. An operation called a Discrete Wavelet Transform (DWT) may be used to decompose the signal into the subbands. A one-dimensional (1-D) DWT provides a time-frequency representation of a time signal, by decomposing it into subband signals with low and high frequency content. Each level of the DWT corresponds to filtering a signal with a low pass filter and a high pass filter and then decimating the filtered signals. The low and high pass filters are designed as perfect reconstruction Quadrature Mirror Filters (QMFs). Mathematically, filtering and decimation operations may be described as follows:

$$L^1(n, m) = \sum_{n'} h_0(2n - n')S(n', m), \text{ and} \qquad \text{Eq. 7}$$

$$H^1(n, m) = \sum_{n'} h_1(2n - n')S(n', m), \qquad \text{Eq. 8}$$

where "n" and "m" represents the indices of time and space samples, respectively; "S" represents the input signal; "$h_0$" and "$h_1$" represent low and high-pass filters, respectively, and "$L^1$" and "$H^1$" represent the subband signals corresponding to the lower half and higher half of the original spectrum, respectively. If the Nyquist frequency for the input signal S is $F_N$, then the subband signal $L^1$ corresponds to the relatively lower frequency band ($0-F_N/2$) of the original spectrum, whereas the subband signal $H^1$ corresponds to the relatively higher frequency band ($F_N/2-F_N$) of the original spectrum.

The decomposition doubles the sampling interval and halves the frequency content. In the following discussion, the subband signals are also referred to as the representation of the signal S at a higher scale. The scale is denoted by the superscript in the description of the subbands herein. For example, the subband signal is "scale 1" after first level of decomposition, which produces the subbands $L^1$ and $H^1$.

The decomposition may be repeated to further increase the frequency resolution. For instance, a second step of the DWT could be used to decompose, for instance, the lower subband signal $L^1$ into higher scale components in another decomposition stage that is described below:

$$L^2(n, m) = \sum_{n'} h_0(2n - n', m)L^1(n', m), \text{ and} \qquad \text{Eq. 9}$$

$$L^1H^1(n, m) = \sum_{n'} h_1(2n - n', m)L^1(n', m). \qquad \text{Eq. 10}$$

In this example, $L^2$ corresponds to the frequency band ($0-F_N/4$) of the original spectrum, whereas the subband signal $L^1H^1$ corresponds to the frequency band ($F_N/4-F_N/2$) of the original spectrum.

It is noted that the signal S may be re-synthesized from subband signals $L^1$ and $H^1$ by upsampling and filtering operations, as described below:

$$S(n - d) = \sum_{n'} g_0(n - n')\overline{L}^1(n') + \sum_{n'} g_1(n - n')\overline{H}^1(n'), \qquad \text{Eq. 11}$$

where "d" represents a constant delay; "$g_0$" and "$g_1$" represent low and high-pass synthesis filters, respectively; and "$\overline{L}^1$" and "$\overline{H}^1$" represent upsampled subband signals which are obtained by padding, or inserting zeros, between the samples, as described below:

$$\overline{L}^1(n) = \begin{cases} L^1(n/2), n \text{ is even} \\ 0, \text{ otherwise} \end{cases}, \text{ and} \qquad \text{Eq. 12}$$

$$\overline{H}^1(n) = \begin{cases} H^1(n/2), n \text{ is even} \\ 0, \text{ otherwise} \end{cases}. \qquad \text{Eq. 13}$$

The 2-D DWT may be obtained by first applying the 1-D DWT in time, as described below:

$$L^4(n, m) = \sum_m h_0(2n - n', m)L^3(n', m), \qquad \text{Eq. 14}$$

$$L^3H^1(n, m) = \sum_m h_1(2n - n', m)L^3(n', m), \qquad \text{Eq. 15}$$

Next, the 1-D DWT is applied in space, as described below:

$$L^4\_L^1(n, m) = \sum_{m'} h_0(n, 2m - m')L^4(n, m'), \text{ and} \qquad \text{Eq. 16}$$

$$L^4\_H^1(n, m) = \sum_{m'} h_1(n, 2m - m')L^4(n, m'), \qquad \text{Eq. 17}$$

where the underscore ("_") represents that the subband has been decomposed in space.

As specific examples, if the Nyquist frequency and wavenumber for the signal S are $F_N$ and $K_N$, respectively, then the subband signals correspond to the following frequency and wavenumber bands: $L^3H^1$: the frequency band ($F_N/8-F_N/16$)

and the wavenumber band (0–$K_N$); $L^4\_H^1$: the frequency band (0–$F_N/16$) and the wavenumber band ($K_N/2$–$K_N$); and $L^4\_L^1$: the frequency band (0–$F_N/16$) and the wavenumber band (0–$K_N/2$).

Figure 10:
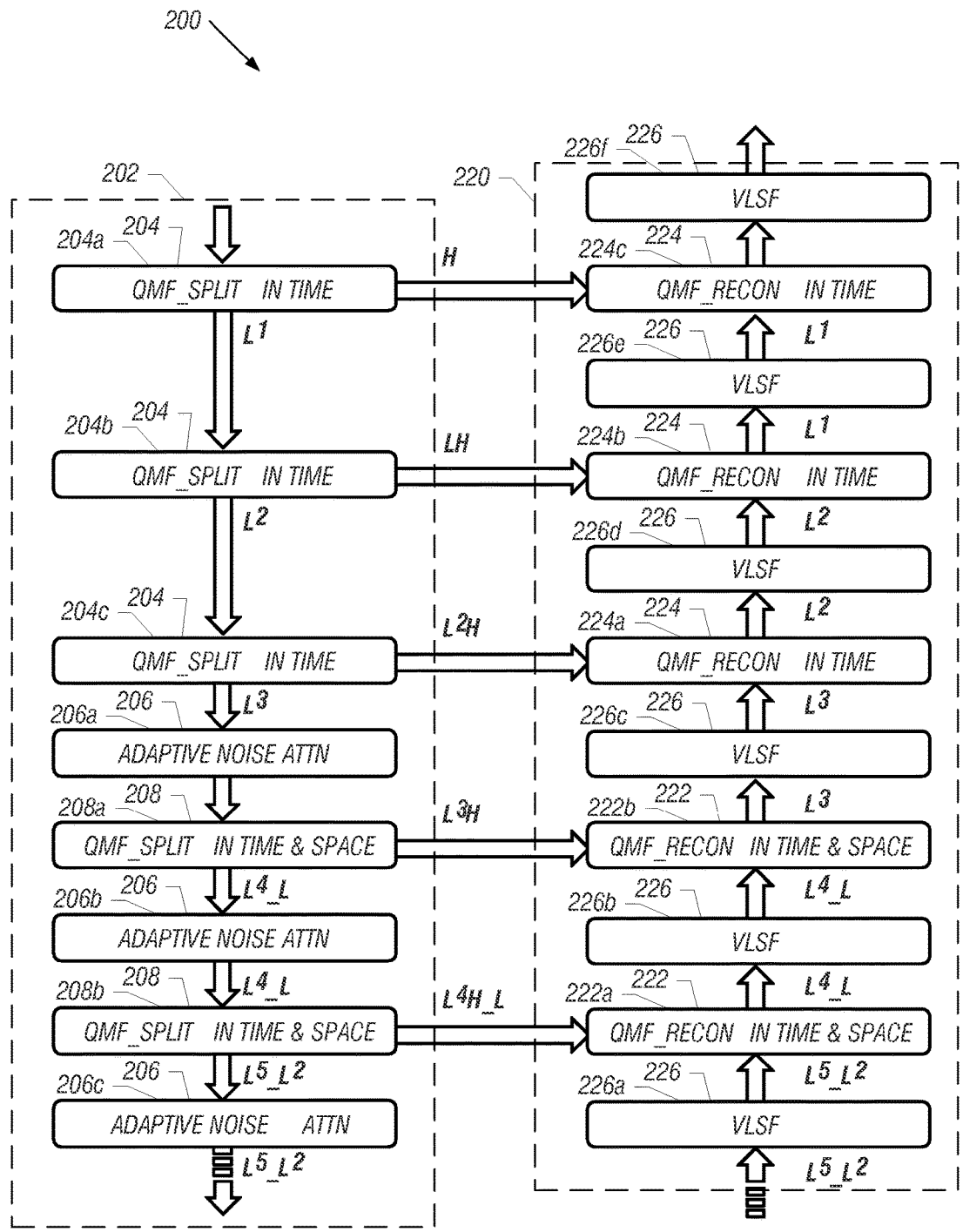

In accordance with embodiments of the invention, the above-described decomposition may be used in a multiple scale noise attenuation technique 200 that is depicted in FIG. 10. Referring to FIG. 10, the technique 200 involves the use of decomposition stages 202 and reconstruction stages 220. For the decomposition stages 202, adaptive noise attenuation 206 is applied to decomposed subbands at different stages of the decomposition process. As specific non-limiting examples, the adaptive noise attenuation may be pursuant to a technique similar to the one disclosed in U.S. Pat. No. 6,446,008, entitled, "Adaptive Seismic Noise And Interference Attenuation Method," which issued on Sep. 3, 2002; or the technique disclosed in U.S. Pat. No. 6,651,007, entitled, "Adaptive Seismic Noise and Interference Attenuation Method," which issued on Nov. 18, 2003. The decomposition of the signal into the subbands may be performed in time (via the exemplary stages 204a, 204b and 204c); and in time and space (as depicted by exemplary stages 208a and 208b).

The decomposition occurs successively, in a stage-by-stage process. In the initial stage 204a, the original signal is decomposed into the H and $L^1$ subbands. The resulting $L^1$ subband is received by the stage 204b for further decomposition, and the H subband is furnished to one of the reconstruction stages 220. The $L^1$ subband, in turn, is received by the next decomposition stage 204b, which decomposes the $L^1$ subband into the LH subband and the $L^2$ subband. The LH subband is furnished to one of the reconstruction stages 220, and the $L^2$ subband is furnished to the next decomposition stage 204c. Stage 204c, in turn, decomposes the $L^2$ subband into an $L^3$ subband and the $L^2H$ subband, which is furnished to one of the reconstruction stages 220.

As can be seen from FIG. 10, initially, the decomposition stages 202 produce more decimated and lower frequency subbands which propagate through the decomposition stages 202, ultimately resulting in the generation of the $L^3$ subband. The higher frequency subbands, which are produced in the initial decomposition, in turn, are furnished to the reconstruction stages 220.

Adaptive noise attenuation is not performed, in accordance with some embodiments of the invention, until the $L^3$ subband is generated. This is due to the fact that the noise is usually weak at higher frequencies, and the adaptive noise attenuation techniques, which are usually computationally intensive, do not have much benefit at these higher frequencies. Therefore, the adaptive noise attenuation, in accordance with the example depicted in FIG. 10, begins with the $L^3$ subband and continues with the lower frequency subbands that are produced therefrom.

More specifically, a decomposition stage 206a performs adaptive noise attenuation on the $L^3$ subband and furnishes the resultant noise-attenuated subband to the next decomposition stage 208a. The decomposition stage 208a, in turn, decomposes the $L^3$ subband pursuant to time and space. In other words, the decomposition stage 208a produces a decimated lower frequency and lower wavenumber subband $L^4\_L$ subband, which is processed by the next adaptive noise attenuation stage 206b. The stage 208a also produces a higher frequency and higher wavenumber subband $L^3H$, which is furnished to one of the reconstruction stages 220. The $L^4\_L$ subband, in turn, is processed by the adaptive noise attenuation stage 206b, and the resulting noise-attenuated subband is furnished to the next decomposition stage 208b.

The above-described process may continue for several successive frequency and wavenumber decompositions, beyond the exemplary stages that are depicted in FIG. 10. Thus, further decompositions in time and space occur; and each lower frequency and lower wavenumber subband is processed by another adaptive noise attenuation stage and then, provided to another decomposition stage 208; and the higher frequency and higher wavenumber subbands produced by the decomposition are furnished to the reconstruction stages 220.

Each splitting operation reduces the data size by two in time and space. Therefore, the number of splits in time and space is limited by the record length in time than the streamer length in space. If a low number of splits is performed, the filters may have a "fuzzy" low frequency response. On the other hand, because of the relatively weak signal content at very low frequencies, the splitting may be stopped when the frequency content of the subband signal drops below 4 Hertz.

The reconstruction stages 220 receive the noise-attenuated subbands from the decomposition stages 202 and use these subbands to reconstruct a signal in which noise attenuation has been performed in the signal cone 180 (FIG. 9). The reconstructions stages 220 include time and space reconstruction stages 222 (exemplary stages 222a and 222b, depicted as examples in FIG. 10) and time only reconstruction stages 224 (exemplary stages 224a, 224b and 224c, being depicted as examples), which correspond to their respective counterparts in the decomposition stages 202. The subbands provided by the decomposition stages 202 are used by the reconstruction stages 222 and 224 to reconstruct the signal.

Additionally, in accordance with some embodiments of the invention, VLSF-based filtering stages 226 (VLSF-based filtering stages 226a, 226b, 226c, 226d, 226e and 226f, being depicted as examples), are interdispersed among the reconstruction stages 220 for purposes of attenuating noise outside of the signal cone 180. Each VLSF-based stage 226 is a low pass spatial filter, which has a filter length that is based on the frequencies of the particular subband being filtered. For example, the VLSF-based stage 226d has the filter length that is based on a frequency range associated with the $L^2$ subband, the VLSF-based stage 226b has a filtering length based on the frequency range associated with the $L^4\_L$ subband, etc.

It is noted that when 2-D QMF splitting is performed, the scales of the time and space components are increased by the same factor. With each additional split, a higher scale representation of the signal is obtained by zooming into lower frequencies and wavenumbers. Because of this property, a single adaptive algorithm prototype may be designed at one scale (a scale that corresponds to the scale of the subband $L^3$, for example) and used for signals at other scales. For example, if the adaptive noise attenuation technique that is described in U.S. Pat. No. 6,446,008 is used, the same number of time and space coefficients and the same generalized constraints may be used at every scale. Similarly, the VLSF coefficients may be designed at one stage, and the same coefficients may be used at other higher or lower stages. The larger apertures of the fixed and adaptive filters at higher scales are obtained by a larger sampling interval and spacing rather than by larger numbers of filter coefficients.

Figure 11:
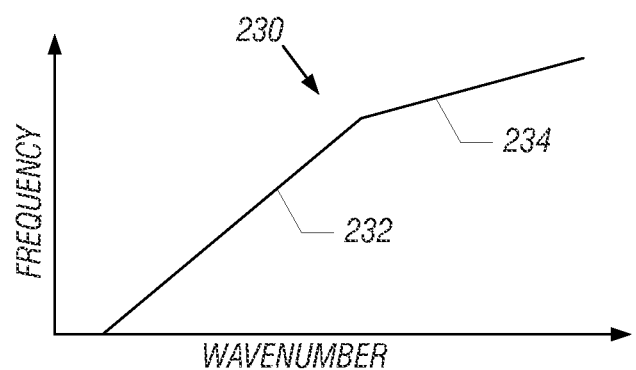
FIG. 11 is a plot illustrating a frequency versus wavenumber characteristic of a variable length spatial filter according to an embodiment of the invention.

In accordance with some embodiments of the invention, the $H_0$ and $H_1$ are FIR half band filters, which are not "perfect" low and high pass filters. Therefore, each filtering and decimation operation creates aliasing at higher frequencies. When shorter analysis filters are used, the aliased components may leak outside of the signal cone 180. For purposes of ensuring that the noise attenuation techniques do not remove an aliased component if the aliased component partially appears outside of the signal cone, the QMF synthesis filters are designed to put the aliased component back into place when the low and high frequency subband signals are synthesized into a lower scale signal. For this reason, in accordance with some embodiments of the inventions, the VLSF coefficients are designed so that the frequency-wavenumber responses of the filters flare out close to the Nyquist wavenumber of the subband signal, as depicted in an exemplary plot 230 of the frequency versus wavenumber characteristic of an exemplary VLSF filter in FIG. 11. As shown, below the Nyquist wavenumber, the filter has a first portion 232 that generally follows the slope of the signal cone 180, and beyond the Nyquist wavenumber, the filter has a smaller slope 234 to ensure the capture of aliased components.

The QMF splitting and reconstruction operations may be performed by circular convolution. This usually creates artifacts on finite length data. A technique used to mitigate edge effects may include process of data to make the data circularly symmetric in time and space before the QMF splitting. For purposes of making a 2-D dataset circularly symmetric, the dataset may be extended in time and space by symmetric reflection about the last trace and time sample. It is noted that in accordance with other embodiments of the invention, the above-disclosed technique of using extrapolation may be used for purposes of addressing the edge effects. In some other applications, the data may be made more circularly symmetric in time and extrapolated in space.

It is noted that with a properly selected shot window, the seismic signal may be located away from the start and end of the shot window. In that case, the circular convolution effects appear only in the noise part of the time-space plots; and therefore, the symmetric extension in time may be omitted. However, extrapolation in space may still be used to avoid edge effects due to both QMF splitting in space and the application of the VLSF filters afterwards.

Figure 12:
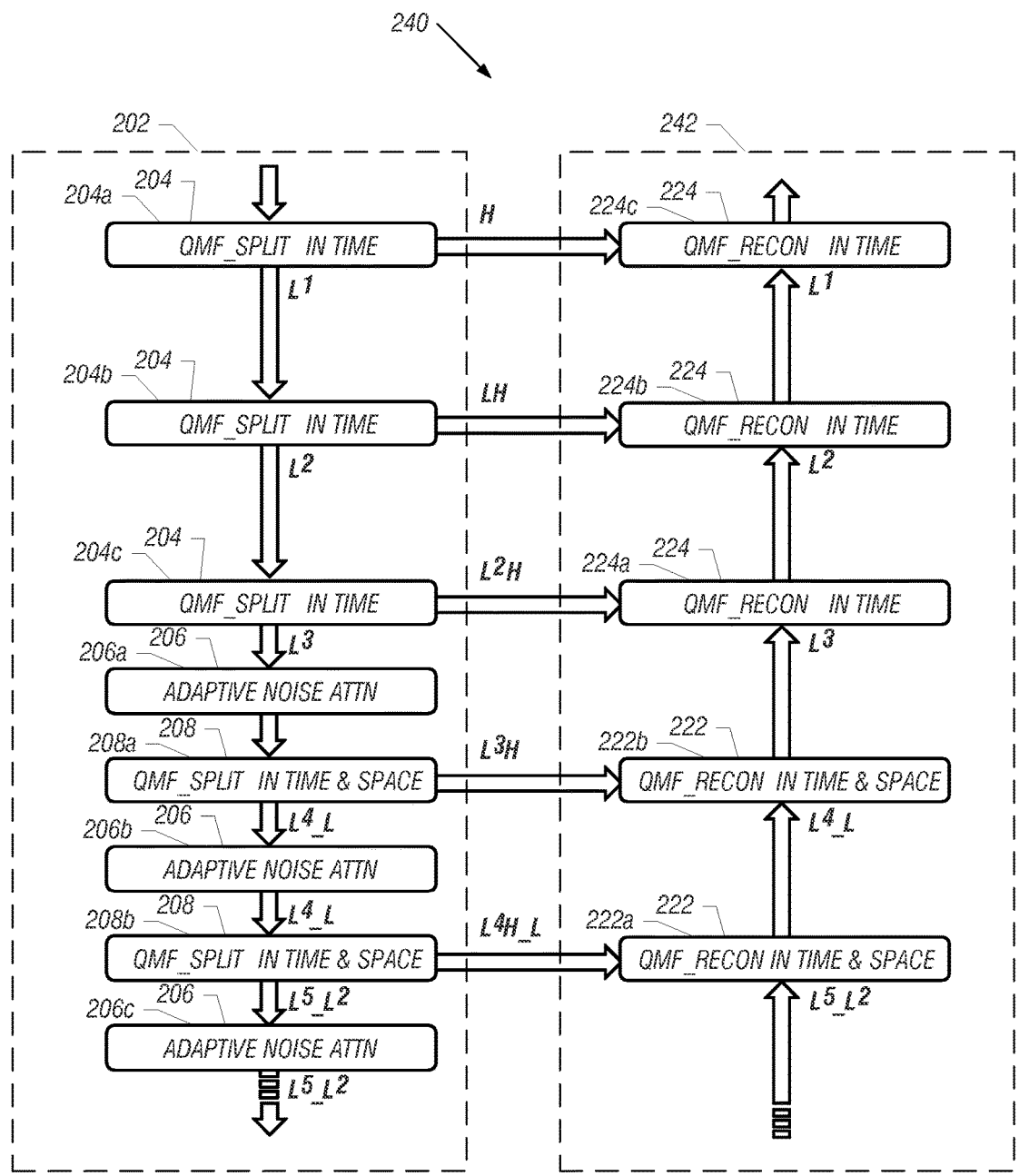

Other embodiments are contemplated and are within the scope of the appended claims. For example, referring to FIG. 12, in accordance with other embodiments of the invention, an alternative multiple scale noise attenuation technique 240 may be used. In general, the technique 240 is similar to the technique 200 (FIG. 10), except that the reconstruction stages 242 (which replace the reconstruction stages 220) do not employ VLSF filtering.

Figure 13:
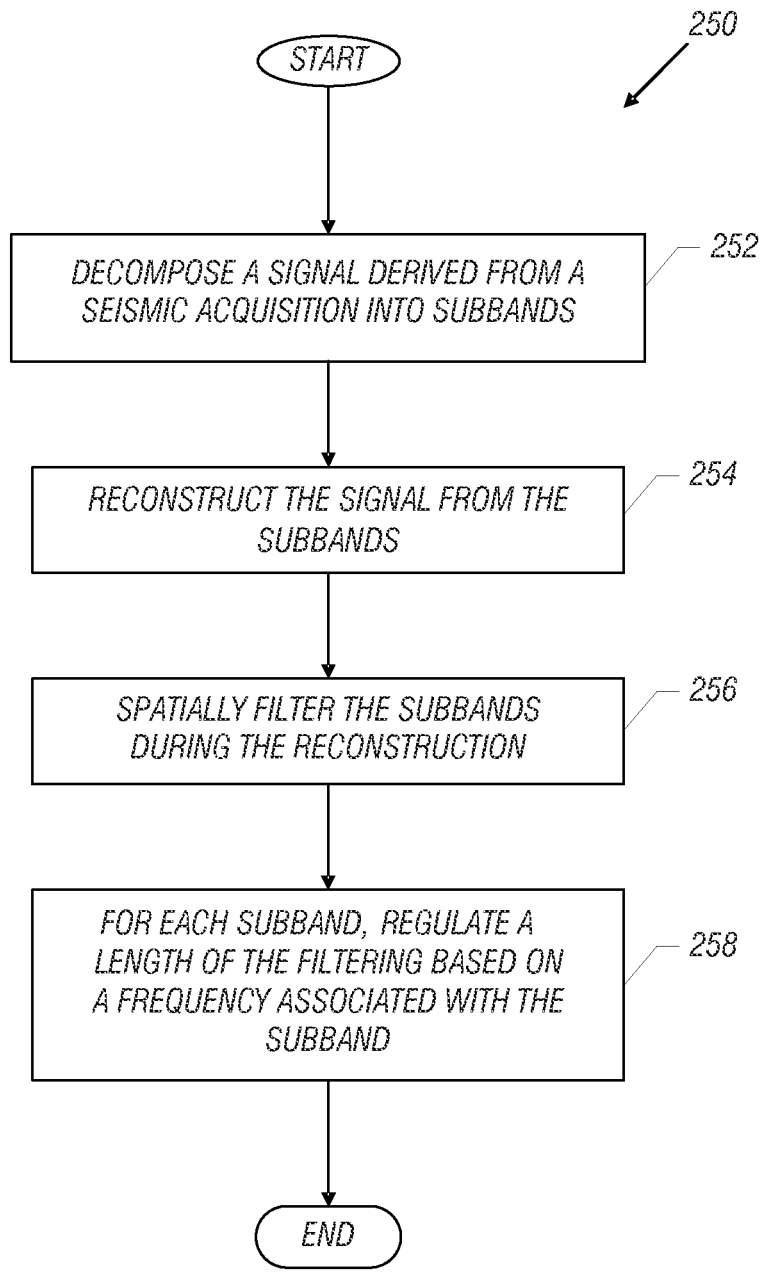

As another variation, a technique 250, which is depicted in FIG. 13, may be used in accordance with other embodiments of the invention. In the technique 250, adaptive noise attenuation is not performed. More specifically, pursuant to the technique 250, a signal that is derived from a seismic acquisition is decomposed into subbands, pursuant to block 252. The signal is both reconstructed (block 254) from these decomposed subbands; and the decomposed subbands are spatially filtered (pursuant to the herein disclosed VLSF filtering technique, for example), pursuant to block 256. Thus, for each subband, a length of the filtering is regulated based on a frequency associated with the subband, pursuant to block 258.

Figure 14:
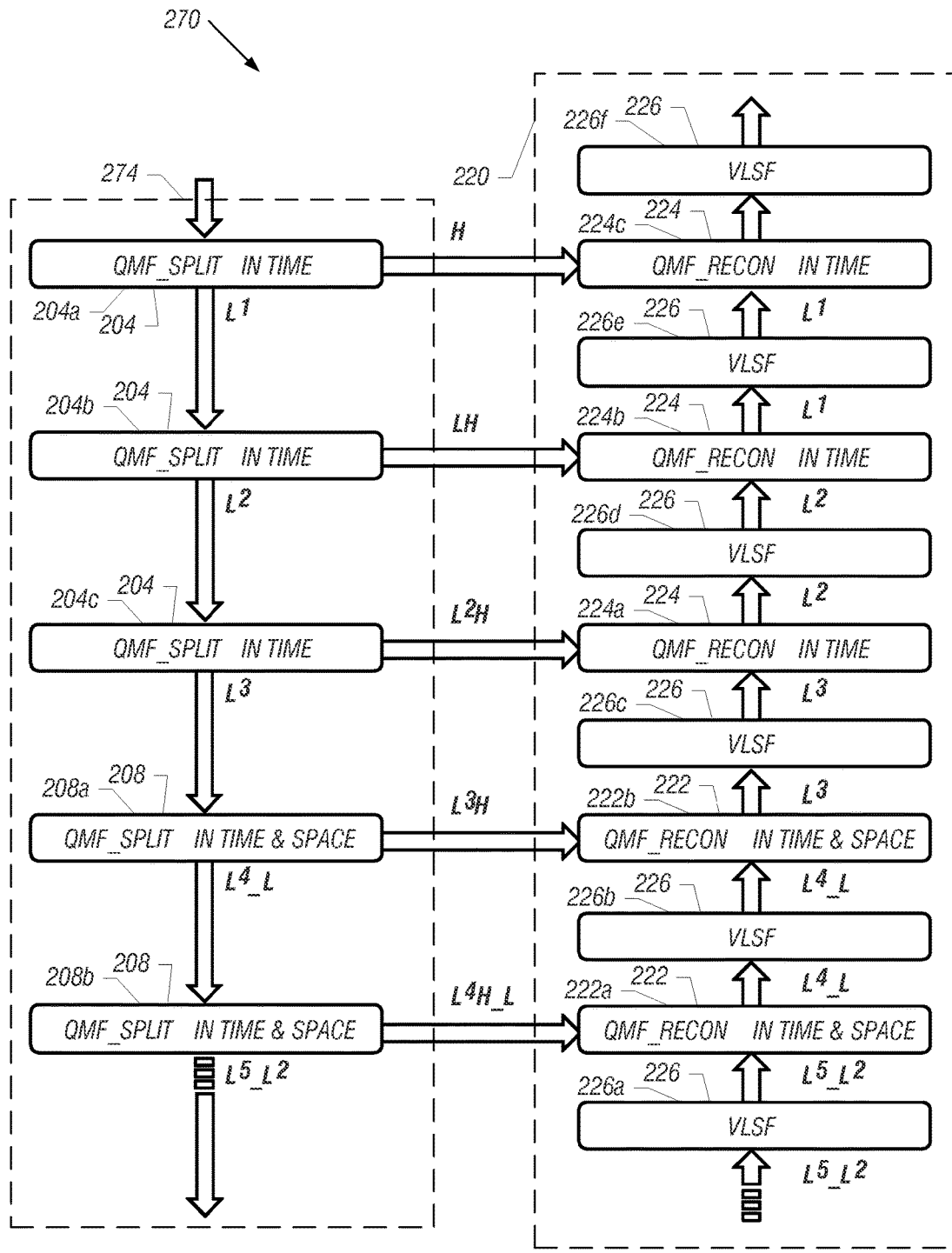

As a more specific example, a multiple scale noise attenuation technique 270 that is depicted in FIG. 14 may be used in accordance with some embodiments of the invention. In general, the technique 270 is similar to the technique 200 (FIG. 10), in that the reconstruction stages 220 are the same. However, unlike the technique 200, the technique 270 includes decomposition stages 274, which replace the decomposition stages 202 and do not include the adaptive noise attenuation stages 206.

Other variations are contemplated and are within the scope of the appended claims.

Figure 15:
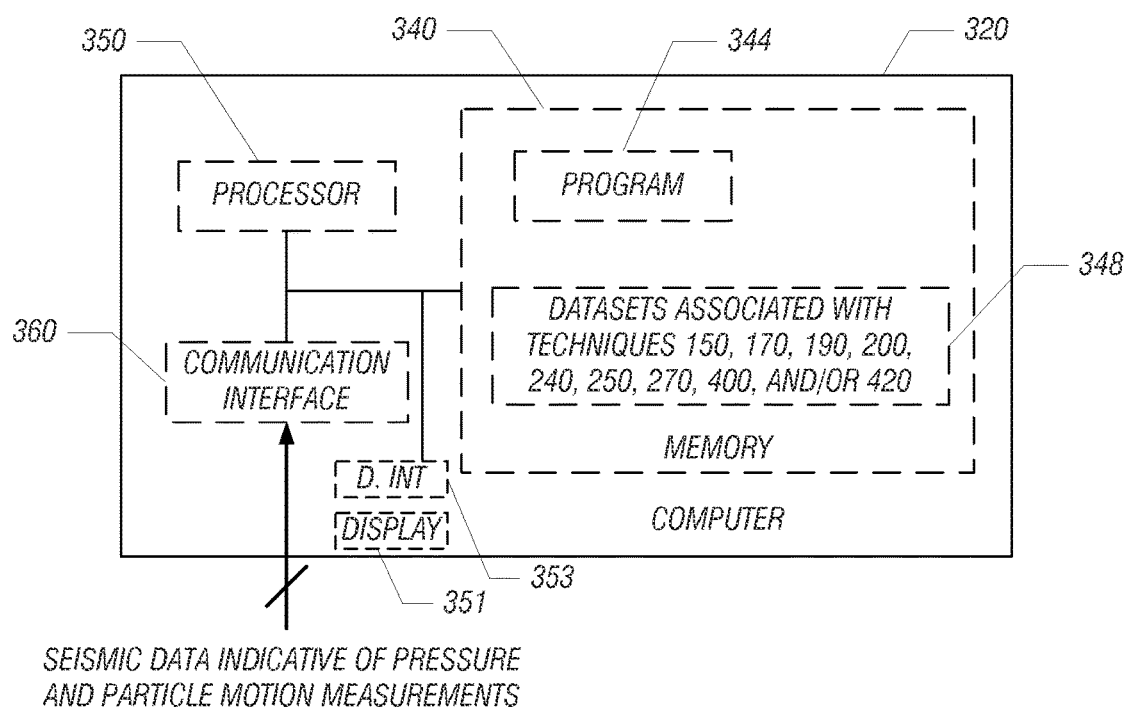
FIG. 15 is a schematic diagram of a data processing system according to an embodiment of the invention.

Referring to FIG. 15, in accordance with some embodiments of the invention, a processing system 320 may perform at least part of one or more of the techniques that are disclosed herein, such as techniques related to variable length spatial filtering, FIR filter design, edge effect mitigation, adaptive noise attenuation and multiple scale noise attenuation, as non-limiting examples.

The system 320 may be located on one of the streamers 30, on each streamer 30, distributed among the streamers 30, on the seismic source 40, on the survey vessel 20, at a remote land-based facility, etc. The system 320 may also be distributed on one or more of these entities, in accordance with other embodiments of the invention. In accordance with some embodiments of the invention, the system 320 may include a processor 350, such as one or more microprocessors and/or microcontrollers.

The processor 350 may be coupled to a communication interface 360 for purposes of receiving seismic data, which are indicative of seismic measurements. In other words, the seismic data indicates signals that are derived from a seismic acquisition and have associated noise components as well as components that are indicative of pressure measurements, vertical particle motion measurements and crossline particle motion measurements, etc. In this regard, the seismic data may be indicative of the raw data received from the streamers 30, processed seismic data, etc. Regardless of its particular form, the seismic data is indicative of at least one signal that is derived from a seismic acquisition.

As a non-limiting example, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the system 320 and may store, for example, various input and/or output data sets 348 involved with the techniques that are described herein. The memory 340 may store program instructions 344, which when executed by the processor 350, may cause the processor 350 to perform at least part and possibly all of one or more of the techniques that are described herein and display results obtained via the technique(s) on the display 374 of the system 320, in accordance with some embodiments of the invention. As shown in FIG. 15, the system 320 may include a display interface 370 that couples the display device 374 to the system 320.

Other embodiments are contemplated and are within the scope of the appended claims. For example, although a towed marine-based seismic acquisition system has been disclosed, the techniques and systems that are disclosed herein may likewise be applied to signals that are derived from other types of seismic acquisitions, such as land-based seismic acquisitions, borehole-based seismic acquisitions, seabed-based seismic acquisitions, etc.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method for conducting a seismic survey using a survey vessel comprising:
   acquiring a signal using a seismic streamer attached to the survey vessel, wherein acquiring the signal is performed using a multi-component sensor having particle motion sensing capabilities associated therewith;
   decomposing, at the seismic streamer or onboard the survey vessel, the signal derived from a seismic acquisition into subbands in successive stages, the subbands being associated with at least different frequency ranges of the signal;
   selectively applying, using a low pass spatial filter, at the seismic streamer or onboard the survey vessel, adaptive noise attenuation in between the successive stages such that the stages decompose noise-attenuated subbands, wherein the low pass spatial filter is configured to adjust a filter length based upon, at least in part, a frequency being filtered; and
   reconstructing, at the seismic streamer or onboard the survey vessel, the signal from the subbands resulting from the decomposition.

2. The method of claim 1, wherein
   some of the subbands resulting from the decomposition are associated with lower frequencies than the remaining subbands resulting from the decomposition; and
   the act of applying adaptive noise attenuation comprises applying the adaptive noise attenuation to the subbands that are associated with the lower frequencies and not applying adaptive noise attenuation to the remaining subbands.

3. The method of claim 1, wherein the subbands are further associated with different wavenumber ranges.

4. The method of claim 3, wherein
   some of the subbands resulting from the decomposition are associated with lower wavenumbers than the remaining subbands resulting from the decomposition; and
   the act of applying adaptive noise attenuation comprises applying the adaptive noise attenuation to the subbands that are associated with the lower wavenumbers and not applying the adaptive noise attenuation to the remaining subbands.

5. The method of claim 1, wherein
   some of the subbands resulting from the decomposition are within a frequency-wavenumber region associated with a desired seismic signal; and
   the act of applying adaptive noise attenuation comprises applying the adaptive noise attenuation to the subbands that are within the frequency-wavenumber region and not applying the adaptive noise attenuation to the first subbands that are outside of the frequency-wavenumber region.

6. The method of claim 1, wherein the act of decomposing comprises performing discrete wavelet transformations.

7. The method of claim 1, further comprising:
   spatially filtering the noise attenuated subbands; and
   for each noise attenuated subband, regulating a length of the filtering based on a frequency associated with the noise attenuated subband.

8. The method of claim 7, wherein spatially filtering includes adapting the filtering to pass through aliasing components of the noise-attenuated subbands.

9. The method of claim 1, wherein decomposing the signal is performed prior to selectively applying adaptive noise attenuation and selectively applying adaptive noise attenuation is performed prior to reconstructing the signal.

10. A system for conducting a seismic survey using a survey vessel comprising:
    a seismic streamer attached to the survey vessel, the seismic streamer configured to acquire a signal using a multi-component sensor having particle motion sensing capabilities associated therewith;
    an interface, at the seismic streamer or onboard the survey vessel, to receive data indicative of a signal derived from a seismic acquisition; and
    a processor, at the seismic streamer or onboard the survey vessel, to:
       decompose the signal into subbands in successive stages, the subbands being associated with at least different frequency ranges of the signal;
       selectively apply, using a low pass spatial filter, adaptive noise attenuation in between the successive stages such that the stages decompose noise-attenuated subbands, wherein the low pass spatial filter is configured to adjust a filter length based upon, at least in part, a frequency being filtered; and
       reconstruct the signal from the subbands resulting from the decomposition.

11. The system of claim 10, wherein the processor is further adapted to selectively spatially filter the subbands between the stages and regulate a length of the filtering based on a frequency associated with the subband being filtered.

12. The system of claim 10, wherein
    some of the subbands resulting from the decomposition are associated with lower wavenumbers than the remaining subbands resulting from the decomposition, and
    the processor is further adapted to process the data to apply the adaptive noise attenuation to the subbands that are associated with the lower wavenumbers and not apply the adaptive noise attenuation to the remaining subbands.

13. The system of claim 10, wherein
    some of the subbands resulting from the decomposition are within a frequency-wavenumber region associated with a desired seismic signal; and
    the processor is further adapted to apply the adaptive noise attenuation to the subbands that are within the frequency-wavenumber region and not apply the adaptive noise attenuation to the subbands that are outside of the frequency-space region.

14. The system of claim 10, wherein the processor is further adapted to perform discrete wavelet transformations to decompose the signal.

15. The system of claim 10, further comprising:
    a spread of at least one streamer comprising seismic sensors to acquire data indicative of the signal derived from the seismic acquisition; and
    a vessel to tow the spread.

* * * * *